United States Patent [19]
Nestor et al.

[11] 3,872,354
[45] Mar. 18, 1975

[54] PORTABLE GROUND FAULT INTERRUPTER

[75] Inventors: David William Nestor, Oroville; Paul E. Wible, Alamo, both of Calif.

[73] Assignee: The Rucker Company, Concord, Calif.

[22] Filed: Nov. 19, 1973

[21] Appl. No.: 416,740

[52] U.S. Cl. .............................. 317/18 D, 317/54
[51] Int. Cl. .............................................. H02h 3/28
[58] Field of Search............ 317/22, 18 D, 18 R, 54

[56] References Cited
UNITED STATES PATENTS

| | | | |
|---|---|---|---|
| 3,579,038 | 5/1971 | Backderf | 317/18 D |
| 3,654,515 | 4/1972 | Kato et al. | 317/18 D |
| 3,771,020 | 11/1973 | Smith | 317/18 D |
| 3,787,709 | 1/1974 | Coe | 317/18 D |

*Primary Examiner*—James D. Trammell
*Attorney, Agent, or Firm*—Flehr, Hohbach, Test, Albritton & Herbert

[57] ABSTRACT

Portable ground fault interrupter which can be plugged into a conventional outlet to provide ground fault protection at any desired location. The interrupter includes a relay having contacts for controlling the flow of current between the outlet and a load connected to the interrupter and an operating coil for holding the contacts in their closed position when energized. The coil receives its holding current through the contacts, and in the event of a ground fault, the coil is bypassed to open the contacts. A reset switch applies current to the relay coil to reenergize it, and means is included for interrupting the current applied to the operating coil following the initial reenergization whereby the coil is reenergized and the contacts are closed only briefly in the event that the ground fault is still present when the reset switch is actuated.

7 Claims, 2 Drawing Figures

PORTABLE GROUND FAULT INTERRUPTER

BACKGROUND OF THE INVENTION

This invention pertains generally to electrical safety devices and more particularly to a portable ground fault circuit interrupter.

Power distribution systems in the United States and elsewhere today commonly include a grounded neutral conductor and one or more ungrounded line conductors. In such systems, the neutral conductor is generally connected to an earth ground, and there is a danger of electrical shock or injury in the event of contact with or leakage to ground from one of the normally ungrounded line conductors. This type of contact or leakage is commonly known as a ground fault, and the current which flows to ground as a result of the fault is known as a ground fault current.

Heretofore, a number of systems have been provided to protect lives and property from the dangers of ground faults. One of the most widely used is a differential circuit breaker of the type described in U.S. Pat. No. 3,213,321, issued Oct. 19, 1965. Such a device monitors the flow of current in the line and neutral conductors and interrupts the flow in the event that the total current flowing toward the load is not equal to the total current flowing back toward the source. Circuit breakers and receptacle outlets with built-in ground fault interrupters are being installed in a number of buildings so that all wiring in the buildings and appliances connected to the outlets are protected. However, there are still a number of unprotected outlets in which the dangers of ground faults are still present.

SUMMARY AND OBJECTS OF THE INVENTION

The invention provides a highly portable ground fault interrupter which can be plugged into a conventional outlet to provide ground fault protection at any desired location. The interrupter includes a relay having contacts for controlling the flow of current between the outlet and a load connected to the interrupter and an operating coil for holding the contacts in their closed position when energized. The coil receives its holding current through the contacts, and in the event of a ground fault, the coil is bypassed to open the contacts. A reset switch applies current to the relay coil to reenergize it, and means is included for interrupting the current applied to the operating coil following the initial reenergization whereby the coil is reenergized and the contacts are closed only briefly in the event that the ground fault is still present when the reset switch is actuated.

It is in general an object of the invention to provide a new and improved ground fault protective device.

Another object of the invention is to provide a device of the above character which can be utilized to provide ground fault protection at a conventional outlet.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
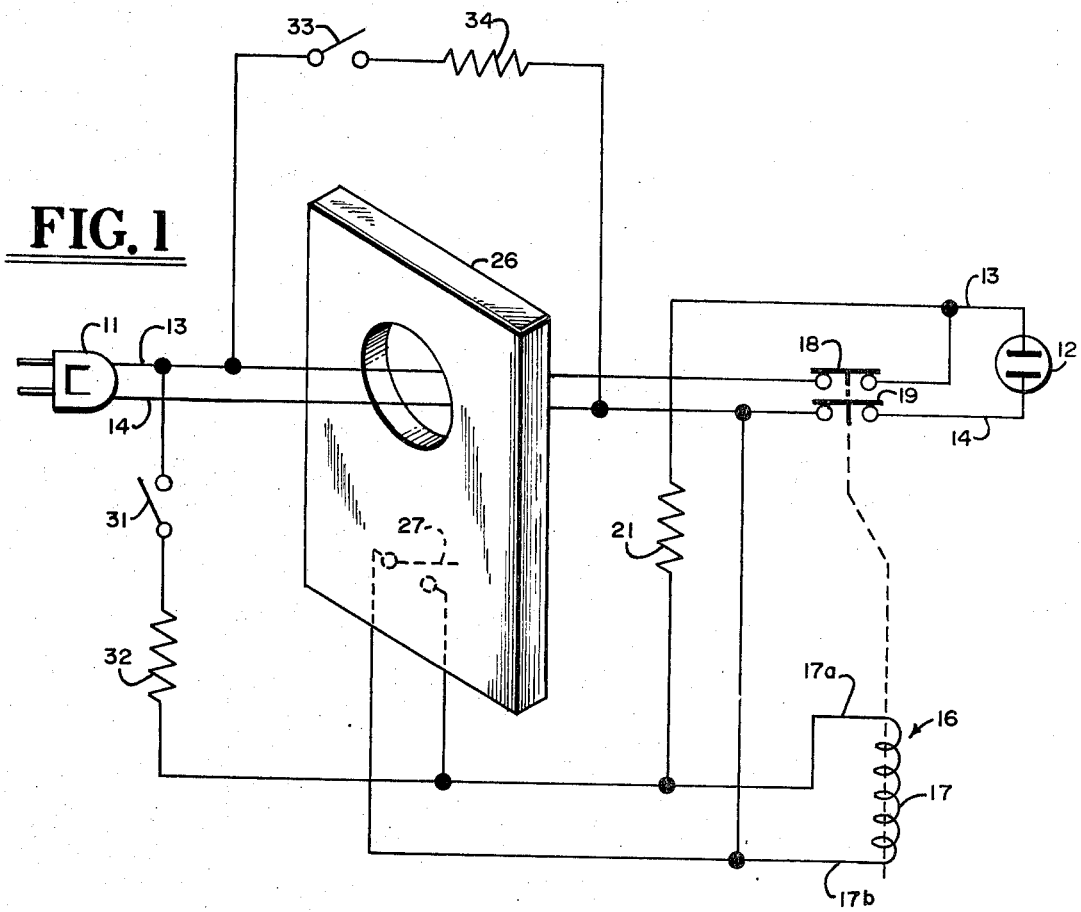
FIG. 1 is a schematic diagram of one embodiment of a ground fault protective device according to the invention.

The embodiment illustrated in FIG. 1 includes a plug 11 for connection to a conventional electrical outlet and a socket 12 for receiving the plug of an electrical appliance. Plug 11 and socket 12 are interconnected by conductors 13 and 14 whereby an appliance or other load connected to socket 12 can be energized from an outlet to which plug 11 is connected.

A relay 16 is provided for interrupting the flow of current in conductors 13 and 14 in the event of a ground fault. The relay includes an operating coil 17 and contacts 18 and 19 which are closed to complete a circuit between plug 11 and socket 12 when the coil is energized. One end or terminal 17a of the coil is connected to conductor 13 at a point between contacts 18 and socket 12 by a current limiting resistor 21. The other end or terminal 17b of the coil is connected to conductor 14 at a point between plug 11 and contacts 19.

A ground fault sensor 26 monitors the flow of current in conductors 13 and 14 and bypasses relay coil 17 to deenergize the same in the event of a ground fault. This sensor can be of known design, and in the preferred embodiment it is of the type disclosed in co-pending application Ser. No. 340,169, now U.S. Pat. No. 3,836,821, filed Mar. 12, 1973 and assigned to the assignee herein. This sensor is constructed in the form of a small self-contained module which obtains operating power from the protected conductors in a known manner. The sensor includes a differential transformer having a toroidal core through which conductors 13 and 14 pass to form one turn primary windings. In the event of a ground fault, there will be an imbalance in the currents in conductors 13 and 14, and this imbalance will produce a fault signal in a secondary winding of the differential transformer. The sensor also includes suitable signal processing circuitry and a switching element 27 which is adapted to close or complete a circuit in response to the fault signal. The switching element is connected across relay coil 17 to bypass the same when closed.

Means is provided for reenergizing relay coil 17 after it has been bypassed and deenergized in response to a ground fault. This means includes a reset switch 31 and a current limiting resistor 32 which are connected between conductor 13 and end 17a of the coil. In the preferred embodiment, switch 31 is a normally open pushbutton switch of the non-latching type.

A test switch 33 and a resistor 34 are connected between conductors 13 and 14 on opposite sides of ground fault sensor 26 to provide means for simulating a ground fault to test the operation of the device. Switch 33 is preferably a normally open non-latching pushbutton switch similar to switch 31.

Operation and use of the embodiment shown in FIG. 1 can be described briefly. It is assumed that plug 11 has been connected to a suitable outlet, that the plug of an appliance has been connected to socket 12, and that relay 16 is energized so that the appliance receives current through conductors 13 and 14. In the absence of a ground fault, relay coil 17 is energized by current passing through contacts 18 and resistor 21. In the event of a ground fault, switching element 27 closes, bypassing coil 17 to deenergize the same. When the coil is deenergized, contacts 18 and 19 open, interrupting the flow of current in conductors 13 and 14. With contact 18 open, relay coil 17 no longer receives current through resistor 21, and it remains deenergized.

Once the ground fault has been corrected, the flow of current in conductors 13 and 14 can be restored by closing reset switch 31 momentarily. With this switch closed, relay coil 17 is reenergized by current from resistor 32, closing contacts 18 and 19. Thereafter, the relay coil is again energized by current from contacts 18 and resistor 21.

In the event that the ground fault has not been corrected at the time when reset switch 31 is closed, switching element 27 will close almost immediately, bypassing coil 17 and preventing further reenergization of the same. Hence, contacts 18 and 19 will close only briefly before reopening until the ground fault is corrected.

Figure 2:
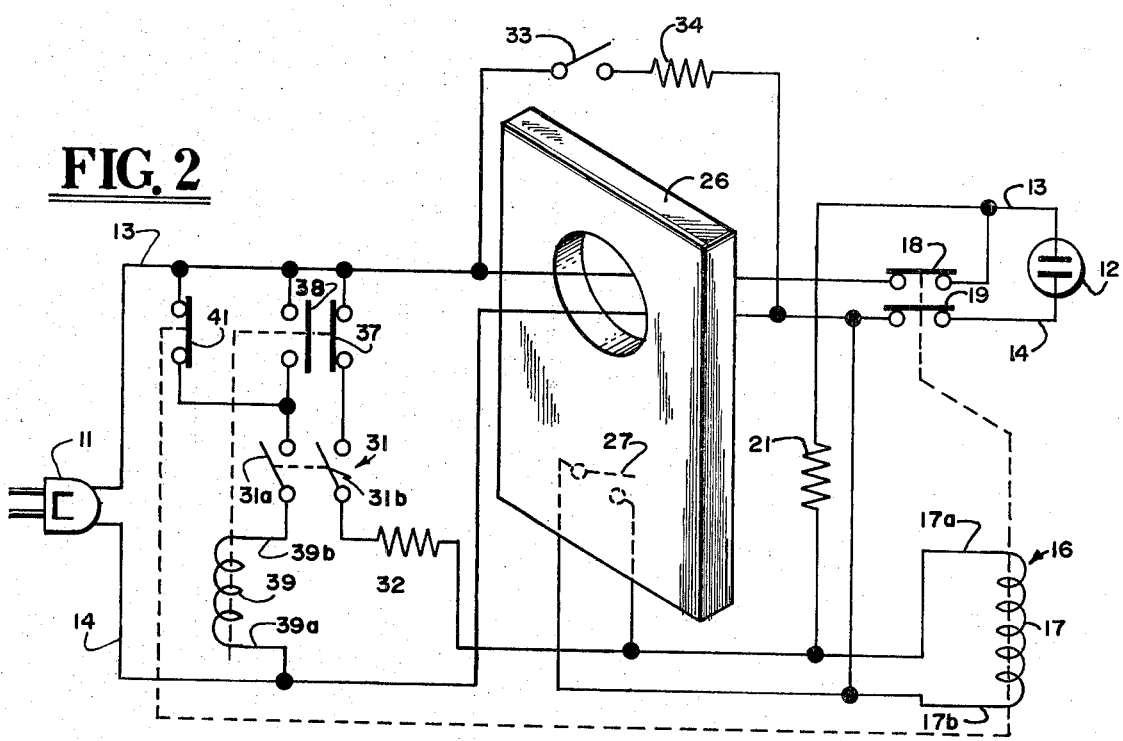
FIG. 2 is a schematic diagram of another embodiment of a ground fault protective device according to the invention.

The embodiment shown in FIG. 2 is largely similar to the embodiment of FIG. 1, and like reference numerals designate similar elements in the two figures. In the embodiment of FIG. 2, however, reset switch 31 is a double pole switch having contacts 31a and 31b. Contacts 31b are connected to resistor 32, as was the reset switch in the first embodiment, but in the present embodiment means is provided for disconnecting contacts 31b from conductor 13 following the initial actuation of the reset switch. This means includes a second relay 36 having a set of normally closed contacts 37, a set of normally open contacts 38, and an operating coil 39. Normally closed contacts 37 are connected between switch contacts 31b and conductor 13, and normally open contacts 38 are connected between this conductor and switch contacts 31a. One end 39a of operating coil 39 is connected to conductor 14, and the other end 39b is connected to switch contacts 31a. An additional set of contacts 41 is connected between conductor 13 and the junction of switch contacts 31a and relay contacts 38. Contacts 41 form a part of relay 16, and they are closed when coil 17 is energized.

In operation and use, the embodiment of FIG. 2 is similar to the embodiment of FIG. 1 until a ground fault has occurred. When the ground fault has been corrected, reset switch 31 is closed, and relay coil 17 is reenergized briefly by current passing through relay contacts 37, switch contacts 31b and resistor 32. As coil 17 is reenergized, contacts 18 and 19 close, as above, and thereafter this coil is energized by current flowing through resistor 21. As coil 17 is reenergized, contacts 41 close, and relay coil 39 is energized by current passing through contacts 41 and switch contacts 31a. When relay coil 39 is energized, normally closed contacts 37 open, interrupting the flow of current through resistor 32, and normally open contacts 38 close. Current passing through contacts 38 and switch contacts 31a keeps coil 39 energized as long as the reset switch is closed. With coil 39 energized, contacts 37 remain open, and the operation of relay 16 is not affected by the reset switch.

In the event that a ground fault has not been corrected at the time the reset switch is closed in the embodiment of FIG. 2, relay coil 17 is energized briefly as the switch is closed. When the flow of current resumes in the conductors, switching element 27 closes, deenergizing coil 17 again. Before the coil is deenergized, however, contacts 41 close, energizing coil 39, thereby opening contacts 37 to interrupt the flow of current through resistor 32 and closing contacts 38 to latch relay 36 in its energized condition. This relay remains in this condition and prevents further reenergization of relay coil 17 as long as switch 31 remains closed. If the ground fault is corrected while the switch is closed, the switch must be opened and then reclosed to reenergize relay 16.

The invention has a number of important features and advantages. It can be constructed in a compact and highly portable form using readily available components throughout. While only the presently preferred embodiments have been described, as will be apparent to those familiar with the art, certain changes and modifications can be made without departing from the scope of the invention as defined by the following claims.

We claim:

1. In a ground fault protective device, electrical contacts movable between closed and open positions for controlling the flow of current in conductors interconnecting a source and a load, a control element adapted for holding the contacts in their closed position when energized, a current limiting element connected between a first terminal of the control element and a first one of the conductors at a point on the load side of the contacts, the second terminal of the control element being connected to a second one of the conductors at a point which remains energized when the contacts are in their open position, ground fault responsive means for bypassing the control element to deenergize said element and cause the contacts to assume their open position in the event of a ground fault in the conductors, and reset switch means connected between the first terminal of the control element and the first conductor at a point on the source side of the contacts for reenergizing the control element to close the contacts when the ground fault has been eliminated.

2. A ground fault protective device as defined by claim 1 further including means for disconnecting the reset switch means from the first conductor when the control element is reenergized.

3. A ground fault protective device as defined by claim 2 wherein the means for disconnecting the reset switch means includes normally closed contacts connected between the first conductor and the reset switch means, a second control element for opening the normally closed contacts when energized, additional contacts controlled by the first named control element for energizing the second control element when the reset switch means is actuated and the first named control element is reenergized, and normally open contacts connected to the second control element and adapted for closing when said element is energized to latch said element in its energized condition.

4. A ground fault protective device as defined by claim 3 wherein the reset switch means includes a set of contacts connected in series with the normally open contacts and the second control element, said set of contacts being closed only when the reset switch means is actuated, whereby the second control element is released from its energized condition when the switch means is released from its actuated condition.

5. A ground fault protective device as defined by claim 1 wherein the control element is the operating coil of a relay.

6. In a ground fault protective device, a relay having contacts for controlling the flow of current in conductors connected thereto and an operating coil for holding the contacts in a closed position when energized, the operating coil being connected to the conductors in such manner that a holding current is applied to the coil from the conductors when the relay contacts are closed, the holding current not being applied when the contacts are open, ground fault responsive means for bypassing the operating coil to deenergize said coil and open the contacts in the event of a ground fault in the conductors, means including a reset switch for applying a reset current to the operating coil to reenergize the same when actuated, and means for interrupting the reset current a predetermined time after the reset switch is actuated and thereafter preventing the reset current from being applied to the coil again as long as the reset switch remains actuated.

7. A ground fault protective device as defined by claim 6 wherein the means for interrupting the reset current and preventing its further application to the operating coil includes a second relay having an operating coil and normally closed and normally open sets of contacts, additional contacts controlled by the operating coil of the first named relay and contacts controlled by the reset switch for energizing the operating coil of the second relay when the reset switch is actuated to reenergize the operating coil of the first named relay, the normally closed contacts being connected in series with the reset switch for interrupting the current through said switch when the operating coil of the second relay is energized, and the normally open contacts and the contacts controlled by the reset switch being connected in series with the operating coil of the second relay for maintaining said coil in its energized condition as long as the reset switch remains actuated.

* * * * *